US011518209B2

(12) United States Patent
Mazaira et al.

(10) Patent No.: US 11,518,209 B2
(45) Date of Patent: Dec. 6, 2022

(54) ELECTRIFIED VEHICLE CONFIGURED TO POWER LIMIT BATTERY BASED ON THERMAL EXCHANGE CAPACITY

(71) Applicant: Ford Global Technologies, LLC, Dearborn, MI (US)

(72) Inventors: Jordan Mazaira, Taylor, MI (US); Brett Allen Dunn, Plymouth, MI (US); Joseph George, Canton, MI (US); Justin Barsano, Hazel Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 16/675,328

(22) Filed: Nov. 6, 2019

(65) Prior Publication Data

US 2021/0129620 A1     May 6, 2021

(51) Int. Cl.
*B60H 1/00* (2006.01)
*H01M 10/625* (2014.01)
*H01M 10/613* (2014.01)
*H01M 10/656* (2014.01)

(52) U.S. Cl.
CPC ...... *B60H 1/00278* (2013.01); *H01M 10/613* (2015.04); *H01M 10/625* (2015.04); *H01M 10/656* (2015.04); *B60H 2001/00307* (2013.01)

(58) Field of Classification Search
None
See application file for complete search history.

(56) References Cited

U.S. PATENT DOCUMENTS

| 2016/0023532 A1* | 1/2016 | Gauthier | H01M 10/6568 62/502 |
| 2016/0351981 A1* | 12/2016 | Porras | H01M 10/635 |
| 2018/0215231 A1 | 8/2018 | Porras et al. | |

FOREIGN PATENT DOCUMENTS

| CN | 108674198 A | * 10/2018 | B60L 50/61 |
| CN | 108674198 A | 10/2018 | |

* cited by examiner

*Primary Examiner* — Karie O'Neill Apicella
(74) *Attorney, Agent, or Firm* — David B. Kelley; Carlson, Gaskey & Olds, P.C.

(57) ABSTRACT

This disclosure relates to an electrified vehicle configured to power limit a battery based on a thermal exchange capacity, and a corresponding method. In particular, an example electrified vehicle includes a battery, a thermal management system configured to circulate thermal exchange fluid relative to the battery, and a controller configured to power limit the battery based on a thermal exchange capacity of the thermal exchange fluid.

20 Claims, 2 Drawing Sheets

ELECTRIFIED VEHICLE CONFIGURED TO POWER LIMIT BATTERY BASED ON THERMAL EXCHANGE CAPACITY

TECHNICAL FIELD

This disclosure relates to an electrified vehicle configured to power limit a battery based on a thermal exchange capacity, and a corresponding method.

BACKGROUND

Generally, electrified vehicles are selectively driven using one or more battery-powered electric machines. Electric machines can drive electrified vehicles instead of, or in addition to, an internal combustion engine. Example electrified vehicles include all-electric vehicles, hybrid electric vehicles (HEVs), plug-in hybrid electric vehicles (PHEVs), fuel cell vehicles, and battery electric vehicles (BEVs). Some electrified vehicles use energy recovery mechanisms, such as regenerative braking systems, to recover energy. The recovered energy is typically stored within a battery until the energy is used to power the electric machines.

SUMMARY

An electrified vehicle according to an exemplary aspect of the present disclosure includes, among other things, a battery, a thermal management system configured to circulate thermal exchange fluid relative to the battery, and a controller configured to power limit the battery based on a thermal exchange capacity of the thermal exchange fluid.

In a further non-limiting embodiment of the foregoing electrified vehicle, the controller is configured to power limit the battery by setting an upper limit on a charge rate and a discharge rate of the battery.

In a further non-limiting embodiment of any of the foregoing electrified vehicles, the controller power limits the battery by deviating from a maximum rate when a temperature of the battery exceeds a threshold.

In a further non-limiting embodiment of any of the foregoing electrified vehicles, the threshold is based on the thermal exchange capacity.

In a further non-limiting embodiment of any of the foregoing electrified vehicles, the threshold is positively correlated to the thermal exchange capacity.

In a further non-limiting embodiment of any of the foregoing electrified vehicles, the upper limit is defined by one of a plurality of limit lines increasing in steepness in a positive correlation to the thermal exchange capacity.

In a further non-limiting embodiment of any of the foregoing electrified vehicles, the plurality of limit lines includes a first limit line deviating from the maximum rate at a first threshold temperature, a second limit line deviating from the maximum rate at a second threshold temperature greater than the first threshold temperature, and a third limit line deviating from the maximum rate at a third threshold temperature greater than the second threshold temperature.

In a further non-limiting embodiment of any of the foregoing electrified vehicles, the controller power limits the battery according to: the first limit line when a temperature of the thermal exchange fluid is between 0-20% less than the temperature of the battery, the second limit line when a temperature of the thermal exchange fluid is between 20-40% less than the temperature of the battery, and the third limit line when a temperature of the thermal exchange fluid is greater than 40% less than the temperature of the battery.

In a further non-limiting embodiment of any of the foregoing electrified vehicles, the controller is configured to determine the thermal exchange capacity by comparing a temperature of the battery with a temperature of the thermal exchange fluid.

In a further non-limiting embodiment of any of the foregoing electrified vehicles, the controller is in electronic communication with a first sensor adjacent the thermal management system, the first sensor is configured to generate an output indicative of a temperature of the thermal exchange fluid, and the controller is configured to determine the temperature of the thermal exchange fluid based on the output of the first sensor.

In a further non-limiting embodiment of any of the foregoing electrified vehicles, the first sensor is adjacent an inlet port of a thermal exchange plate mounted adjacent the battery.

In a further non-limiting embodiment of any of the foregoing electrified vehicles, the controller is in electronic communication with a second sensor adjacent the battery, the second sensor is configured to generate an output indicative of a temperature of the battery, and the controller is configured to determine the thermal exchange capacity by comparing the outputs of the first and second sensors.

In a further non-limiting embodiment of any of the foregoing electrified vehicles, the electrified vehicle is a hybrid electric vehicle.

In a further non-limiting embodiment of any of the foregoing electrified vehicles, the battery is rechargeable and is configured to discharge to propel the electrified vehicle.

A method according to an exemplary aspect of the present disclosure includes, among other things, power limiting a battery of an electrified vehicle based on a thermal exchange capacity of a thermal exchange fluid.

In a further non-limiting embodiment of the foregoing method, the power limiting step includes deviating from a maximum rate when a temperature of the battery reaches a threshold, and the threshold is positively correlated to thermal exchange capacity.

In a further non-limiting embodiment of any of the foregoing methods, the power limiting step includes setting an upper limit on a discharge rate and a charge rate of the battery, and the upper limit is defined by one of a plurality of limit lines increasing in steepness in a positive correlation to the thermal exchange capacity.

In a further non-limiting embodiment of any of the foregoing methods, the upper limit on the discharge rate and the charge rate follows one of the limit lines when the temperature of the battery exceeds the threshold.

In a further non-limiting embodiment of any of the foregoing methods, the upper limit follows one of a first limit line deviating from the maximum rate at a first threshold temperature, a second limit line deviating from the maximum rate at a second threshold temperature greater than the first threshold temperature, and a third limit line deviating from the maximum rate at a third threshold temperature greater than the second threshold temperature. Further, an average slope of the second limit line is steeper than an average slope of the first limit line and shallower than an average slope of the third limit line.

In a further non-limiting embodiment of any of the foregoing methods, the method includes determining the thermal exchange capacity based on a difference between a temperature of the battery and a temperature of the thermal exchange fluid.

DETAILED DESCRIPTION

This disclosure relates to an electrified vehicle configured to power limit a battery based on a thermal exchange capacity, and a corresponding method. In particular, an example electrified vehicle includes a battery, a thermal management system configured to circulate thermal exchange fluid relative to the battery, and a controller configured to power limit the battery based on a thermal exchange capacity of the thermal exchange fluid. This disclosure has a number of benefits which will be appreciated from the following description. Among them, this disclosure gradually reduces a battery power limit at relatively high battery temperatures which reduces if not eliminates, driveline disturbances that may have otherwise been caused by abruptly power limiting the battery. At the same time, this disclosure does not needlessly power limit the battery. Rather, this disclosure permits the battery pack to run at relatively high charge and discharge rates even when the battery temperature is relatively high, as long as the thermal exchange capacity is also relatively high.

Figure 1:
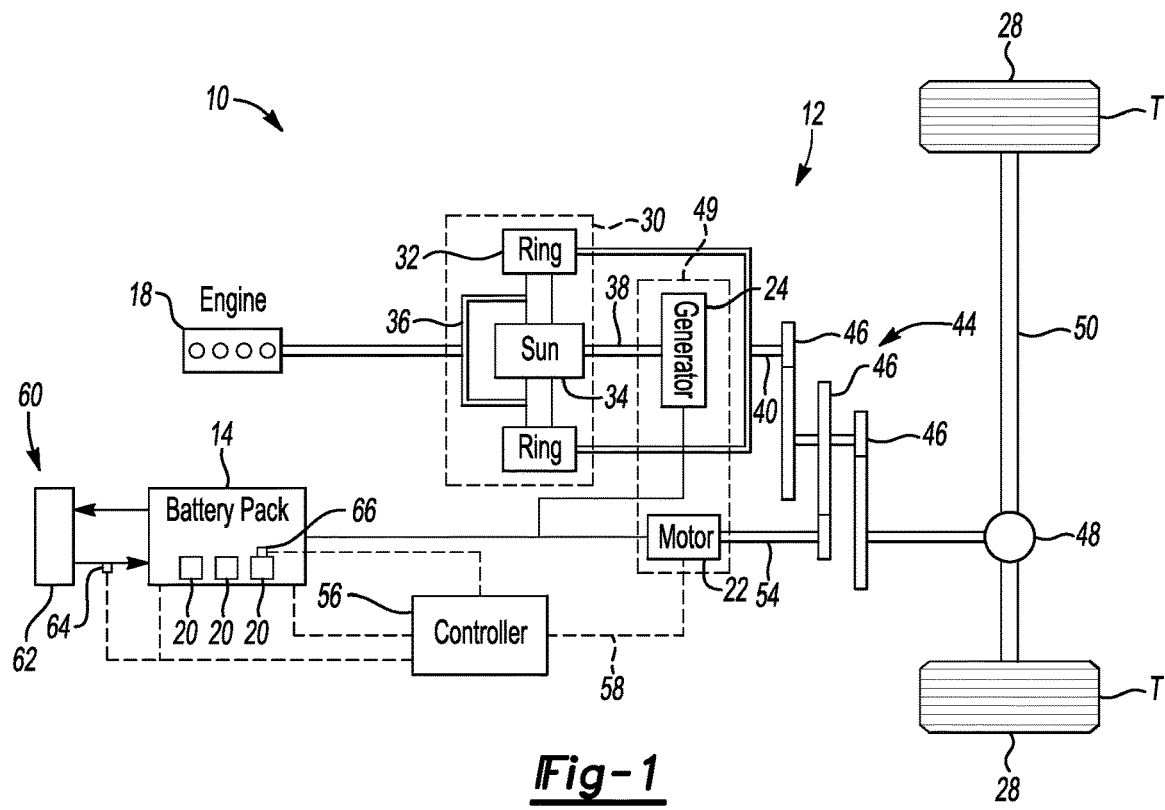
FIG. 1 schematically illustrates various aspects of an example powertrain of an electrified vehicle.

FIG. 1 schematically illustrates an example powertrain 10 for an electrified vehicle 12 ("vehicle 12"), which in this example is a hybrid electric vehicle (HEV). The powertrain 10 may be referred to as a hybrid transmission. Although depicted as an HEV, it should be understood that the concepts described herein are not limited to HEVs and could extend to other electrified vehicles, including, but not limited to, plug-in hybrid electric vehicles (PHEVs), battery electric vehicles (BEVs) and fuel cell vehicles (FCVs). This disclosure also extends to various types of hybrid vehicles including full hybrids, parallel hybrids, series hybrids, mild hybrids, micro hybrids, and plug-in hybrids. Further, the vehicle 12 is depicted schematically in FIG. 1, but it should be understood that this disclosure is not limited to any particular type of vehicle, and extends to cars, trucks, sport utility vehicles (SUVs), vans, etc.

With continued reference to FIG. 1, a battery pack 14, sometimes referred to as a vehicle battery or simply a battery, and an internal combustion engine 18 selectively operate with the powertrain 10. The battery pack 14 is configured to discharge to propel the vehicle 12 via the powertrain 10. The battery pack 14 is also rechargeable, and in particular includes arrays 20 of rechargeable battery cells. In this disclosure, any reference to the battery pack 14 also includes, where appropriate, the arrays 20 of battery cells. For instance, reference to a temperature of the battery pack 14 is a reference to a temperature of the cells of the battery pack 14, and, as discussed below, may include a highest-reported temperature of the cells of the battery pack 14.

The powertrain 10 further includes a motor 22 and a generator 24, both of which are types of electric machines. The motor 22 and generator 24 may be separate or may have the form of a combined motor-generator.

Figure 2:
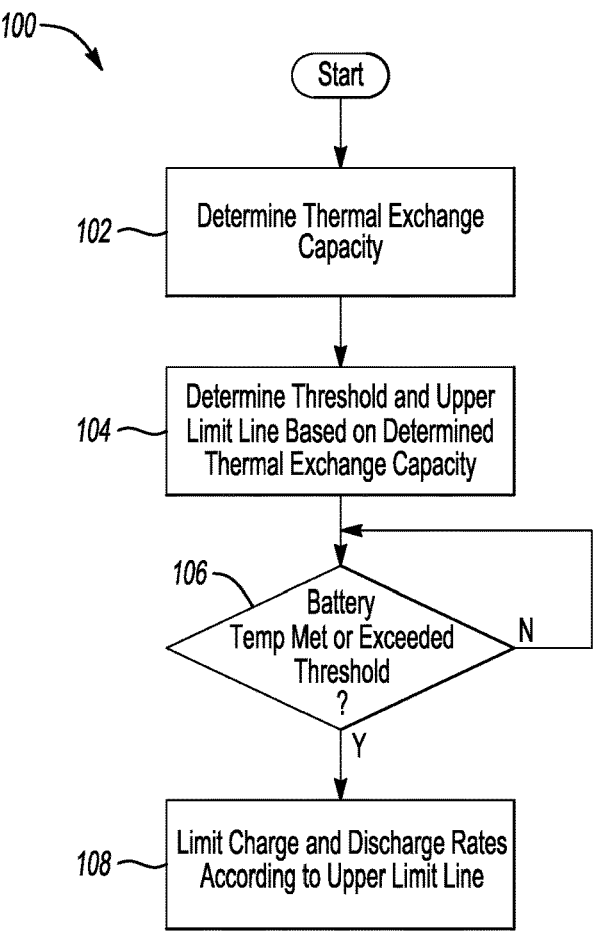
FIG. 2 is a flow chart representative of an example method.

In the embodiment of FIG. 1, the powertrain 10 is a power-split transmission that employs a first drive system and a second drive system. The first and second drive systems generate torque to drive one or more sets of vehicle drive wheels 28, which include tires T configured to directly contact a road surface R (FIG. 2). While two vehicle drive wheels 28 are shown in FIG. 1, this disclosure is not limited to vehicles with two wheels, and extends to vehicles with two or more wheels, some or all of which may be drive wheels. The first drive system includes a combination of the engine 18 and the generator 24. The second drive system includes at least the motor 22, the generator 24, and the battery pack 14. The motor 22 and the generator 24 are portions of an electric drive system of the powertrain 10.

The engine 18 and the generator 24 may be connected through a power transfer unit 30, such as a planetary gear set. Other types of power transfer units, including other gear sets and transmissions, can be used to connect the engine 18 to the generator 24. In one non-limiting embodiment, the power transfer unit 30 is a planetary gear set that includes a ring gear 32, a sun gear 34, and a carrier assembly 36.

The generator 24 can be driven by the engine 18 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 18, for example, to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28. The motor 22 can be selectively employed to drive the vehicle drive wheels 28 by outputting torque to a shaft 54 that is also connected to the second power transfer unit 44.

Further, in this embodiment, the motor 22 and the generator 24 cooperate as part of an energy recovery mechanism 49, which in this example is a regenerative braking system, in which both the motor 22 and the generator 24 can be employed as motors to output torque. For example, the motor 22 and the generator 24 can each output electrical power to recharge cells of the battery pack 14.

The vehicle 12 may additionally include or be in electronic communication with a computing system including a controller 56. The controller 56 is configured to monitor and/or control various aspects of the powertrain 10 and associated vehicle 12. For example, the controller 56 may communicate with the electric drive system, the power transfer units 30, 44, and/or other sensors and components to monitor various conditions of the vehicle 12, control the vehicle 12, or both. The controller 56 includes electronics, software, or both, to perform the necessary control functions for operating the vehicle 12. In one non-limiting embodiment, the controller 56 is a combination vehicle system controller and powertrain control module (VSC/PCM). In another non-limiting embodiment, the controller 56 is part of the battery energy control module (BECM). Although it is shown as a single device, the controller 56 may include multiple controllers in the form of multiple hardware devices, or multiple software controllers within one or more hardware devices. A controller area network (CAN) 58, illustrated schematically, allows the controller 56 to communicate with the various components of the vehicle 12.

Heat may be generated by the arrays 20 of the battery cells within the battery pack 14 during charging (i.e., recharging) and discharging operations, for example. In this example, the vehicle 12 includes a thermal management system 60 to thermally condition (i.e., heat or cool) the battery pack 14.

The thermal management system 60, for example, may include a fluid source 62 and at least one thermal exchange plate assembly mounted adjacent the arrays 20. In some examples the thermal exchange plate assemblies may be referred to as cold plate assemblies. The thermal management system 60 may include one or more pumps configured to circulate thermal exchange fluid, such as coolant, within the thermal management system 60. The thermal management system 60 may include various conduits, valves, inlet ports, outlet ports, etc., configured to effect the circulation of the thermal management fluid relative to the battery pack 14. This disclosure is not limited to the specific details of the thermal management system 60 shown in FIG. 1, and extends to other types of thermal management systems.

The controller 56 is in electronic communication with the battery pack 14 and the thermal management system 60. In a particular aspect of this disclosure, the controller 56 is configured to power limit the battery pack 14 by setting an upper limit on the charge and discharge rates of the battery pack 14. As will be explained below, the controller 56 is configured to power limit of the battery pack 14 based on a thermal exchange capacity, such as cooling capacity, of the thermal exchange fluid within the thermal management system 60.

To this end, the controller 56 is in electronic communication with a sensor 64 configured to generate an output indicative of a temperature of the thermal exchange fluid within the thermal management system 60. The sensor 64 may be arranged directly in a flow path of the thermal management system 60 such that at least a portion of the sensor 64 is exposed to the thermal exchange fluid. Alternatively, the sensor 64 may be mounted to a conduit of the thermal management system 60 and therefore by indirectly exposed to the thermal exchange fluid.

The sensor 64 may be a known type of temperature sensor, such as a thermocouple. The sensor 64 in this example is located adjacent an inlet port of a thermal exchange plate mounted adjacent the battery pack 14. In this way, the sensor 64 is configured to report a temperature of the thermal exchange fluid before it thermally interacts with the battery pack 14. The sensor 64 could be positioned in other locations within the thermal management system 60.

The thermal exchange capacity of the thermal exchange fluid is the ability of the thermal exchange fluid to cool the battery pack 14, and in some instances may be referred to as the cooling capacity of the thermal exchange fluid. The thermal exchange capacity is determined in one example by comparing a temperature of the battery pack 14 with a temperature of the thermal exchange fluid. Alternatively or additionally, the thermal exchange capacity may be determined by determining a temperature gradient needed to reject a particular amount of heat from the battery pack 14, and determining whether the temperature of the thermal exchange fluid is able to achieve that gradient. In either case, when the temperature of the thermal exchange fluid is lower than the battery pack, the thermal exchange fluid will exhibit a higher thermal exchange capacity with an increasing difference between the temperatures of the thermal exchange fluid and the battery pack.

The temperature of the battery pack 14 is determined, in one example, based on an output of a sensor 66 mounted adjacent the cells of the battery pack 14. While only one sensor 66 is shown in FIG. 1, there may be additional such sensors. The sensor 66 (and any additional sensors, if present) may be mounted adjacent a cell within one of the arrays 20. If there are multiple sensors, the controller 56 may consider a highest-reported temperature of the sensors, such that the control strategy discussed below is implemented relative to the hottest battery cell.

As a temperate of the battery pack 14 increases during operation of the vehicle 12, the battery pack 14 may rapidly approach a maximum operating temperature relatively rapidly, and need to be abruptly power limited, if a cooling capacity of a thermal exchange fluid is relatively low. In this disclosure, the controller 56 is configured to power limit the battery pack 14 based on a thermal exchange capacity of the thermal exchange fluid. The term power limit means that the controller configured to limit the charge and discharge rates of the battery pack 14.

With joint reference to FIGS. 2 and 3, an example method 100 of use will now be described. In this disclosure, the method begins at 102 by determining the thermal exchange capacity of the thermal exchange fluid. The controller 56 may determine the thermal exchange capacity by comparing the outputs of the first and second sensors 64, 66, as discussed above. From the thermal exchange capacity, the controller 56 then determines, at 104, a threshold battery temperature at which point the controller 56 will begin power limiting the battery pack 14, and an upper limit line which will dictate the upper (i.e., maximum) discharge and charge rates of the battery pack 14 for battery temperatures above the threshold.

Figure 3:
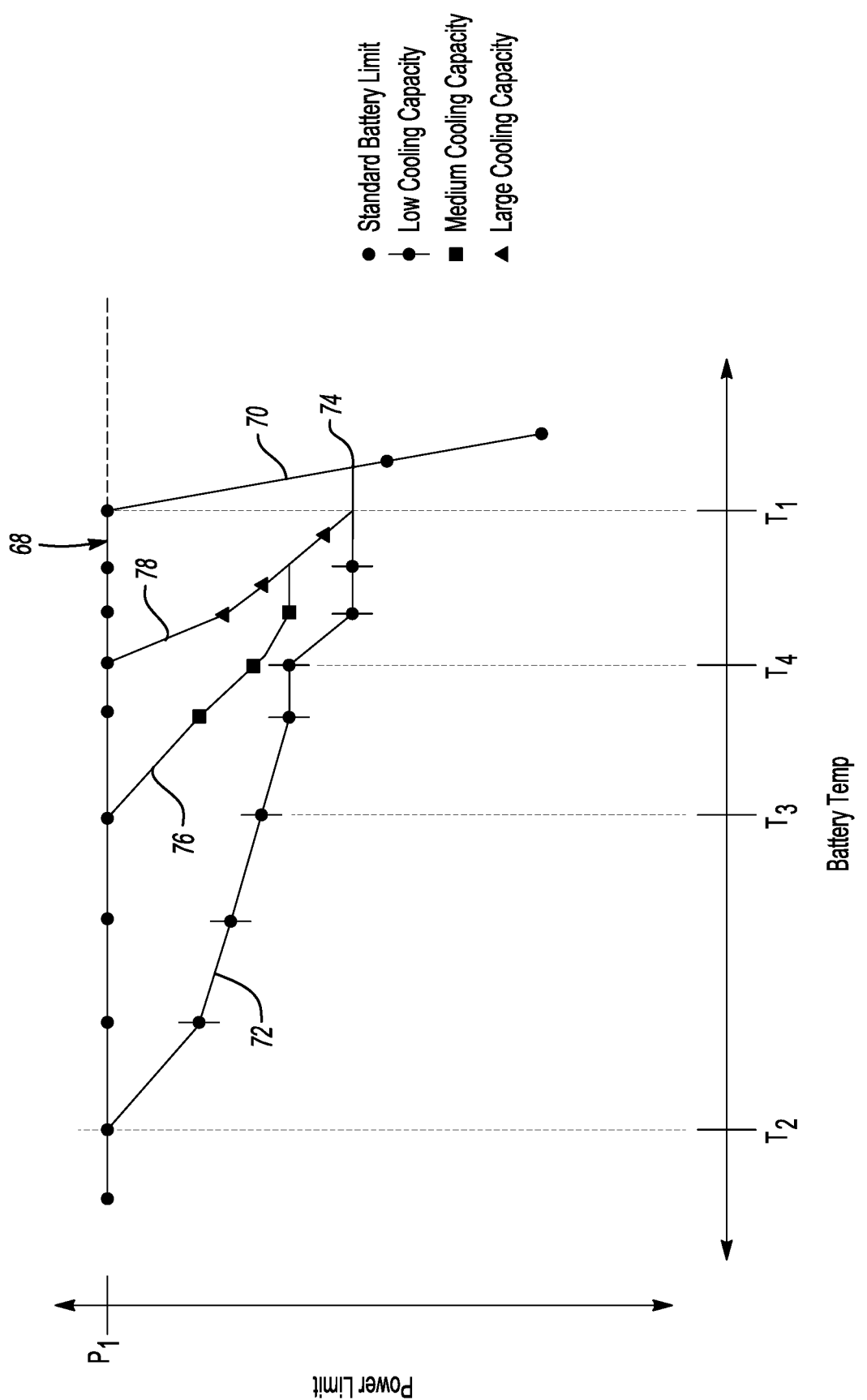
FIG. 3 is a plot of exemplary relationships between battery power limits relative to battery temperature.

Example thresholds and upper limit lines are illustrated in FIG. 3. As will be discussed, the thresholds are positively correlated to thermal exchange capacity, meaning the higher the thermal exchange capacity, the higher the threshold. Further, the steepness of the upper limit lines are also positively correlated to thermal exchange capacity, meaning the higher the thermal exchange capacity, the steeper the upper limit line. In turn, when thermal exchange capacity is relatively low, the upper limit line will be relatively gradual, and thus the battery pack 14 will not be abruptly power limited.

In FIG. 3, a plurality of upper limit lines are shown. Three of the upper limit lines are dependent on a thermal exchange capacity of the thermal exchange fluid. One line, which is a standard limit line 68, is indicated by circles in FIG. 3 and is not dependent on thermal exchange capacity of the thermal exchange fluid. Rather, when controlled according to the standard limit line 68, the battery pack 14 is permitted to charge and discharge at a maximum rate $P_1$ until the battery temperature reaches a standard threshold temperature $T_1$, at which point the controller 56 limits the charge and discharge rates of the battery pack 14 based on the relatively steep slope of the line segment 70 labeled in FIG. 3. The standard threshold temperature $T_1$ may be a predetermined factory setting. The standard limit line 68 may abruptly limit the power of the battery pack 14 all the way down to zero in some situations or until the temperature of the battery pack 14 has reduced to a point where a non-zero power limit is again permissible. To this end, FIG. 3 is intentionally unitless, and is merely intended to explain example control strategies without being limited to particular numerical values.

FIG. 3 also illustrates three thermal exchange capacity-dependent upper limit lines and corresponding thresholds.

The three upper limit lines and thresholds will be referred to herein as low, medium, and high. It should be understood that these relative terms are for illustrative purposes only. It should also be understood that this disclosure is not limited to three upper limit lines and thresholds. Rather, this disclosure extends to one or more such thresholds and upper limit lines. Further, there could be an infinite number of thresholds and upper limit lines. In other words, the controller 56 could be programmed to derive particular thresholds and upper limit lines in real time, and the precision at which the controller sets the threshold temperatures and slopes of the upper limit lines could effectively make this system infinitely adjustable.

If the controller 56 determines that the thermal exchange capacity of the thermal exchange fluid is relatively low, then the controller 56 power limits the battery pack 14 by deviating from the maximum rate $P_1$ when the temperature of the battery pack 14 reaches a low cooling capacity threshold $T_2$. For battery pack 14 temperatures above the low cooling capacity threshold $T_2$, the controller 56 power limits the battery pack 14 according to a first, low cooling capacity upper limit line 72 (indicated by vertical dashes). The average slope of the low cooling capacity upper limit line 72 between the low cooling capacity threshold $T_2$ and a point 74 where the low cooling capacity upper limit line 74 intersects the line segment 70 is substantially less steep (i.e., shallower) than the average slope of the line segment 70. As such, the charge and discharge rates of the battery pack 14 are controlled more gradually than when the controller 56 follows the standard limit line 68. Thus, the vehicle 12 is far less likely to produce driveline disturbances that may be noticeable by a driver or passenger, for example. In the case of a hybrid electric vehicle, the gradual tapering off of the charge and discharge rates can be compensated by the internal combustion engine in a way that produces minimal, if any, noticeable driveline disturbances.

With continued reference to the example of FIG. 3, the controller 56 may apply the low cooling capacity threshold $T_2$ and the low cooling capacity upper limit line 72 when the thermal exchange capacity of the thermal exchange fluid is relatively low. When the thermal exchange capacity is within a medium range, the controller 56 follows a medium cooling capacity upper limit line 76 (indicated by squares) for temperatures at or above a medium cooling capacity threshold $T_3$. Further, when the thermal exchange capacity is relatively high (i.e., large), the controller 56 follows a high cooling capacity upper limit line 78 (indicated by triangles) for temperatures at or above a high cooling capacity threshold $T_4$.

As shown in FIG. 3, the medium cooling capacity threshold $T_3$ is greater than the low cooling capacity threshold $T_2$, but less than the high cooling capacity threshold $T_4$. Each of the three cooling capacity thresholds $T_2$-$T_4$ is less than the standard threshold temperature $T_1$ in this example. Further, like the low cooling capacity upper limit line 72, the medium cooling capacity upper limit line 76 and high cooling capacity upper limit line 78 deviate from the maximum rate $P_1$ at their respective threshold capacities $T_3$, $T_4$ and extend to the point 74. The average slope of the medium cooling capacity upper limit line 76 is steeper than that of the low cooling capacity upper limit line 72, but is shallower than that of the high cooling capacity upper limit line 78. The steepness of the average slope of all three upper limit lines 72, 76, 78 is less than that of the line segment 70 in this example. In this way, the controller 56 avoids abruptly power limiting the battery pack 14 but still permits the battery pack 14 to run at higher charge and discharge rates at greater temperatures when cooling capacity is relatively high.

In the method 100, at 104 the controller 56 may determine which of the thresholds and upper limit lines to follow based on the outputs of the first and second sensors 64, 66, and by inputting those outputs into an algorithm or look-up table, as examples. In one example, when the temperature of the thermal exchange fluid is between 0-20% less than that of the battery pack 14 (e.g., the highest-reported cell temperature), the controller 56 applies the low cooling capacity threshold $T_2$ and the low cooling capacity upper limit line 72. When the temperature of the thermal exchange fluid is 20-40% less than that of the temperature of the cells of battery pack 14, the controller 56 applies the medium cooling capacity threshold $T_3$ and the medium cooling capacity upper limit line 76. Likewise, when the temperature of the thermal exchange fluid greater than 40% less than the temperature of the cells of battery pack 14, the controller 56 applies the high cooling capacity threshold $T_3$ and the high cooling capacity upper limit line 78. The ranges discussed in this paragraph are exemplary only. Again, this disclosure may consider a different number of ranges and ranges extending between different values, and may also be infinitely adjustable.

With reference back to FIG. 2, the controller 56, at 106, determines whether the temperature of the battery pack 14, which again may be the highest-reported cell temperature, has met or exceeded the threshold selected at 104. If so, the controller 56, at 108, controls the charge and discharge rates according to the upper limit line selected at 104. The method 100 repeats itself periodically or continuously to account for changes in battery temperature or thermal exchange capacity, as examples.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a battery;
   a thermal management system configured to circulate thermal exchange fluid relative to the battery; and
   a controller configured to power limit the battery based on a thermal exchange capacity of the thermal exchange fluid.

2. The electrified vehicle as recited in claim 1, wherein the controller is configured to power limit the battery by setting an upper limit on a charge rate and a discharge rate of the battery.

3. The electrified vehicle as recited in claim 2, wherein the controller power limits the battery by deviating from a maximum rate when a temperature of the battery exceeds a threshold.

4. The electrified vehicle as recited in claim 3, wherein the threshold is based on the thermal exchange capacity.

5. The electrified vehicle as recited in claim 4, wherein the threshold is positively correlated to the thermal exchange capacity.

6. An electrified vehicle, comprising:
a battery;
a thermal management system configured to circulate thermal exchange fluid relative to the battery; and
a controller configured to power limit the battery based on a thermal exchange capacity of the thermal exchange fluid,
wherein the controller is configured to power limit the battery by setting an upper limit on a charge rate and a discharge rate of the battery,
wherein the controller power limits the battery by deviating from a maximum rate when a temperature of the battery exceeds a threshold,
wherein the threshold is based on the thermal exchange capacity,
wherein the threshold is positively correlated to the thermal exchange capacity, and
wherein the upper limit is defined by one of a plurality of limit lines increasing in steepness in a positive correlation to the thermal exchange capacity.

7. The electrified vehicle as recited in claim 6, wherein the plurality of limit lines includes a first limit line deviating from the maximum rate at a first threshold temperature, a second limit line deviating from the maximum rate at a second threshold temperature greater than the first threshold temperature, and a third limit line deviating from the maximum rate at a third threshold temperature greater than the second threshold temperature.

8. The electrified vehicle as recited in claim 7, wherein the controller power limits the battery according to:
the first limit line when a temperature of the thermal exchange fluid is between 0-20% less than the temperature of the battery,
the second limit line when a temperature of the thermal exchange fluid is between 20-40% less than the temperature of the battery, and
the third limit line when a temperature of the thermal exchange fluid is greater than 40% less than the temperature of the battery.

9. The electrified vehicle as recited in claim 1, wherein the controller is configured to determine the thermal exchange capacity by comparing a temperature of the battery with a temperature of the thermal exchange fluid.

10. The electrified vehicle as recited in claim 9, wherein:
the controller is in electronic communication with a first sensor adjacent the thermal management system,
the first sensor is configured to generate an output indicative of a temperature of the thermal exchange fluid, and
the controller is configured to determine the temperature of the thermal exchange fluid based on the output of the first sensor.

11. The electrified vehicle as recited in claim 10, wherein the first sensor is adjacent an inlet port of a thermal exchange plate mounted adjacent the battery.

12. The electrified vehicle as recited in claim 10, wherein:
the controller is in electronic communication with a second sensor adjacent the battery,
the second sensor is configured to generate an output indicative of a temperature of the battery, and
the controller is configured to determine the thermal exchange capacity by comparing the outputs of the first and second sensors.

13. The electrified vehicle as recited in claim 1, wherein the electrified vehicle is a hybrid electric vehicle.

14. The electrified vehicle as recited in claim 1, wherein the battery is rechargeable and is configured to discharge to propel the electrified vehicle.

15. A method, comprising:
power limiting a battery of an electrified vehicle based on a thermal exchange capacity of a thermal exchange fluid.

16. The method as recited in claim 15, wherein:
the power limiting step includes deviating from a maximum rate when a temperature of the battery reaches a threshold, and
the threshold is positively correlated to thermal exchange capacity.

17. The method as recited in claim 16, wherein:
the power limiting step includes setting an upper limit on a discharge rate and a charge rate of the battery, and
the upper limit is defined by one of a plurality of limit lines increasing in steepness in a positive correlation to the thermal exchange capacity.

18. The method as recited in claim 17, wherein the upper limit on the discharge rate and the charge rate follows one of the limit lines when the temperature of the battery exceeds the threshold.

19. The method as recited in claim 18, wherein the upper limit follows one of a first limit line deviating from the maximum rate at a first threshold temperature, a second limit line deviating from the maximum rate at a second threshold temperature greater than the first threshold temperature, and a third limit line deviating from the maximum rate at a third threshold temperature greater than the second threshold temperature, and wherein an average slope of the second limit line is steeper than an average slope of the first limit line and shallower than an average slope of the third limit line.

20. The method as recited in claim 15, further comprising determining the thermal exchange capacity based on a difference between a temperature of the battery and a temperature of the thermal exchange fluid.

* * * * *